FIP8106 OR 3,928,760

United States Patent [19]

Isoda

[11] 3,928,760

[45] Dec. 23, 1975

[54] REMOTE CONTROL SYSTEM

[75] Inventor: Mikio Isoda, Katano, Japan

[73] Assignee: Matsushita Electric Industrial Co., Ltd., Kadoma, Japan

[22] Filed: May 7, 1974

[21] Appl. No.: 467,664

Related U.S. Application Data

[63] Continuation of Ser. No. 316.459, Dec. 19, 1972, abandoned.

[30] Foreign Application Priority Data

Dec. 27, 1971 Japan .................................. 46-3559

[52] U.S. Cl. .......... 250/199; 178/DIG. 15; 325/392

[51] Int. Cl.² .............................................. H04B 9/00

[58] Field of Search ............ 250/199; 325/392, 394; 178/DIG. 15

[56] References Cited

UNITED STATES PATENTS 2,506,672 5/1950 Kell et al. ........................... 250/199

2,943,146 6/1960 Thomas, Jr. ................. 178/DIG. 15

3,657,543 4/1972 Rose ................................. 250/199

*Primary Examiner*—Robert L. Griffin

*Assistant Examiner*—Marc E. Bookbinder

*Attorney, Agent, or Firm*—Burgess Ryan and Wayne

[57] ABSTRACT

A remote control system for use in remote controlling a television receiver is provided in which a light signal is used as the remote control signal. An electroluminescent diode is used to emit the remote control light signal which is amplitude-modulated by a modulating frequency in the ultrasonic frequency range and has a very narrow band of wave lengths. The remote control system is very compact in size and completely free from the erratic operations caused by the noise.

6 Claims, 12 Drawing Figures

1R

REMOTE CONTROL SYSTEM

This is a continuation of application Ser. No. 316,459, filed Dec. 19, 1972, and now abandoned.

BACKGROUND OF THE INVENTION

The present invention relates to a remote control system of a type using a light signal for selecting a channel of a television signal.

In the wireless remote control systems for television receivers, it is very important to prevent erratic remote control operations due to noise. In conventional remote control systems for television receivers, the remote control signals of a frequency in the ultrasonic frequency range have been generally used so that erratic operations tend to occur very often due to the ambient noise in the ultrasonic frequency range produced for example when coins, keys or the like strike against each other. Therefore the conventional remote control systems using the ultrasonic frequency signals are not reliable in operation.

SUMMARY OF THE INVENTION

The primary object of the present invention is therefore to provide a novel remote control system best suited for use with a television receiver which is highly reliable in operation and is free from any erratic operation due to the noise. A transmitter which is very compact in size and light in weight transmits the light signal which is emitted from an electroluminescent diode and is amplitude-modulated by a modulating frequency in the ultrasonic frequency range.

DESCRIPTION OF THE PREFERRED EMBODIMENT

Figure 1A:
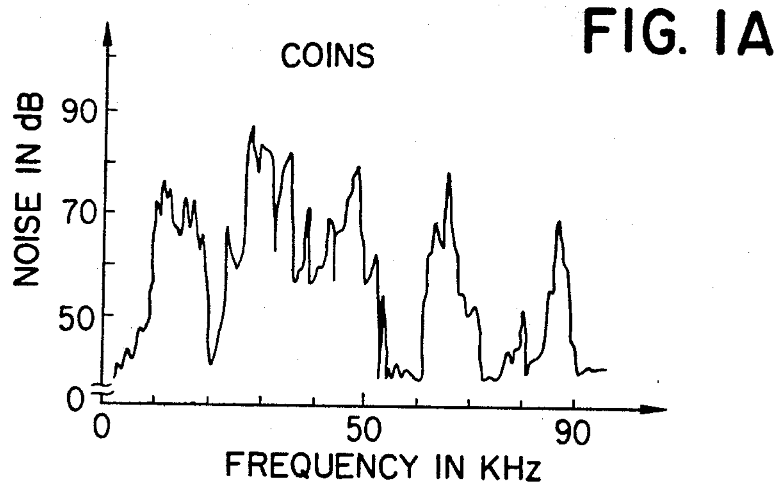
FIGS. 1A and 1B show the spectra of the ambient noises in the ultrasonic frequency range present in the natural environment.
Figure 1B:
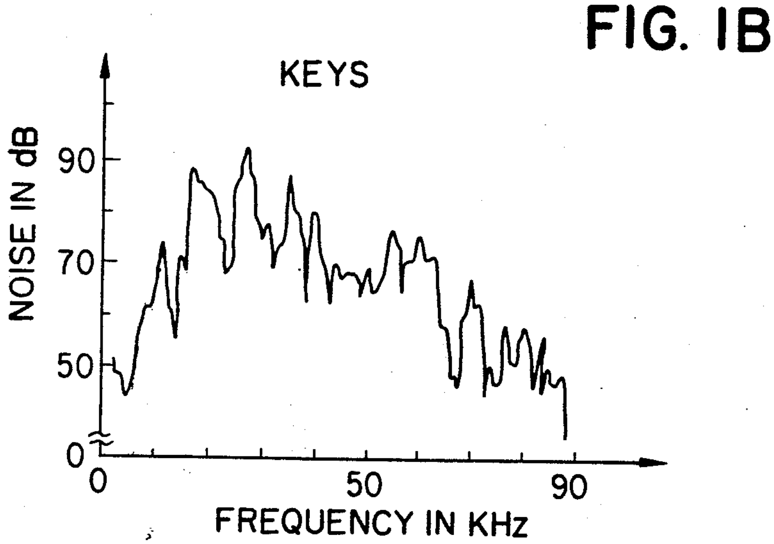

First referring to FIGS. 1 and 2, the underlying principle of the present invention will be described. FIG. 1A shows the spectrum of the ambient noise in the ultrasonic frequency range produced when two coins strike against each other, and FIG. 1B shows also the spectrum of the ambient noise in the ultrasonic frequency produced when a plurality of keys strike against each other. It is seen from FIGS. 1A and 1B that the various ambient noises are always present in the natural environment so that the erratic operations occur very often in the conventional remote control systems of the type using the ultrasonic waves of a frequency of 40 KHz as a control signal.

The inventor measured the amplitude-modulated light components present in the natural envinment in order to investigate the possibility of using the light signal as the remote control signal. The results are shown in FIGS. 2A, 2B, 2C and 2D. The measurements were made at the output terminal of a phototransistor which was used as a light intercepting element in a remote control chassis in a television receiver as will be described in more detail hereinafter. The residual interior noise of this phototransistor in the dark room was about 0.08 mV over the whole range. From FIGS. 2A, 2B, 2C and 2D it is seen that in case of a fluorescent lamp connected to a power source of a commercial frequency (60 Hz) the light components amplitudemodulated by frequencies up to 1 KHz are present in the natural envirnment, but there are almost no light components amplitude-modulated by the frequencies in the ultrasonic frequency range (that is the range higher than tens of KHz). Therefore when a light signal which is amplitude-modulated by the frequency in the ultrasonic frequency range is used as a control signal, the erratic operations which are caused by the ambient noise may be eliminated in a remote control system. However, there is not available a conventional light source such as an incandescent lamp or the like, except a discharge lamp, which may emit light which is amplitude-modulated by the frequency in the ultrasonic frequency range. When a gas discharge lamp is used a high voltage source (about hundreds of volts) must be provided so that a gas discharge lamp cannot be used in a remote control system for use with a television receiver because the transmitter becomes inevitably large in size.

To overcome the above and other problems the present invention utilizes an electroluminescent diode so that a transmitter compact in size may radiate the remote control light signal which is amplitude-modulated by a frequency in the ultrasonic frequency range.

Figure 2A:
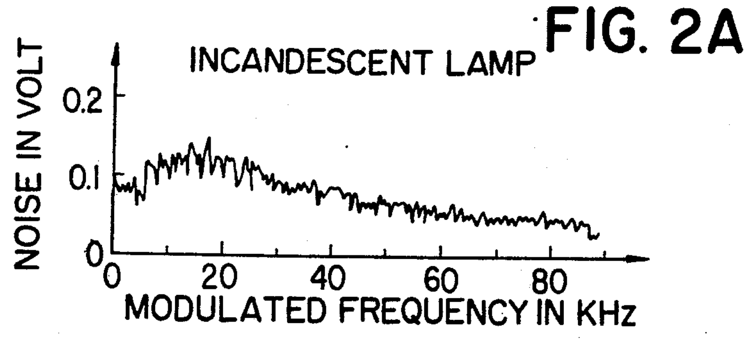
FIGS. 2A, 2B, 2C and 2D show the spectra of amplitude-modulated light present in the natural environment.
Figure 2B:
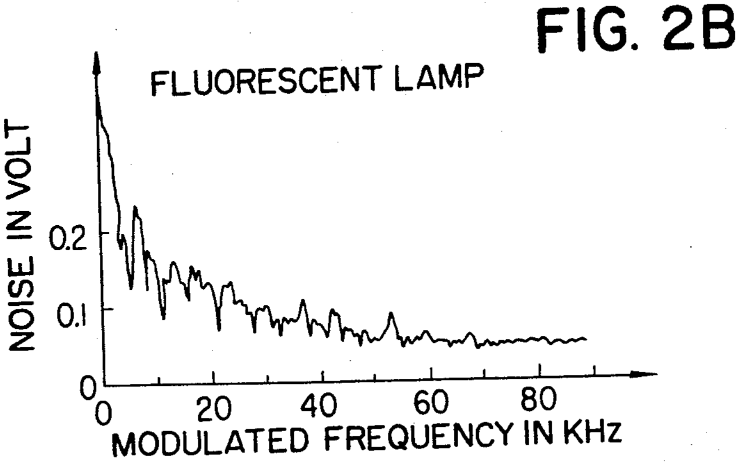
Figure 2C:
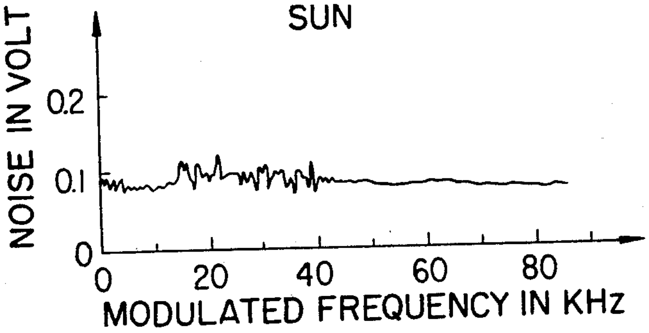
Figure 2D:
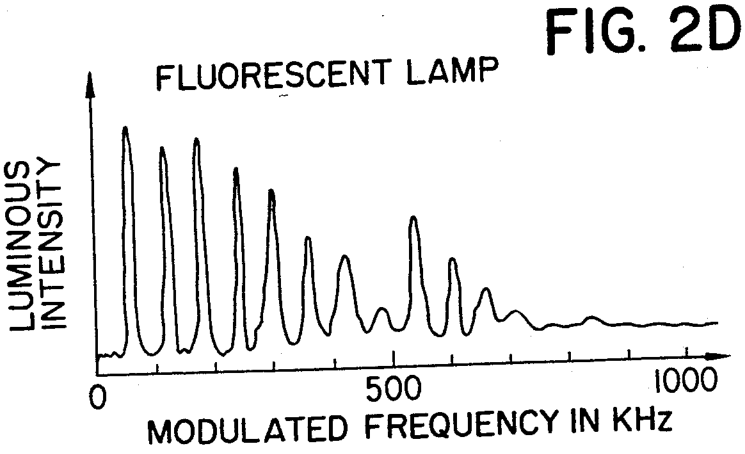

In FIG. 2 the spectra of amplitude-modulated light components from an incandescent lamp, a fluorescent lamp connected to a power source of a commercial frequency (60 Hz) and the Sun are shown at A, B and C, respectively, and FIG. 2D shows the spectrum of light components from a fluorescent lamp which is amplitude-modulated by a low frequency.

Figure 3:
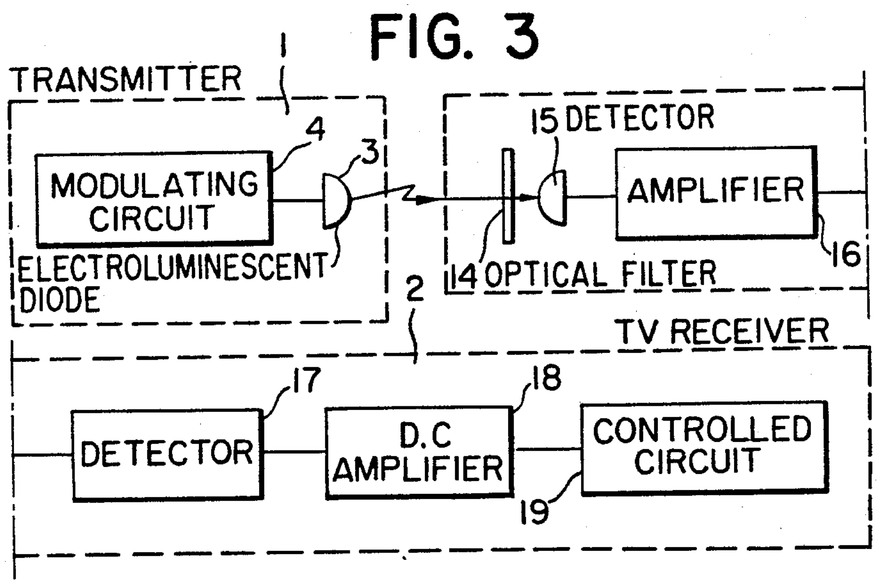
FIG. 3 is a block diagram of a remote control system in accordance with the present invention.
Figure 4A:
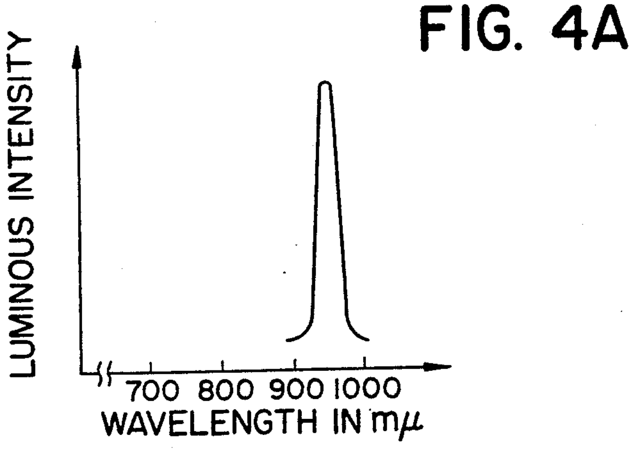
FIGS. 4A and 4B are graphs used for the explanation of the emission spectrum of an electroluminescent diode and of the property of an optical filter used in the remote control system of the present invention.

FIG. 3 is a block diagram of a preferred embodiment of a remote control device in accordance with the present invention for use with a television receiver. The remote control system generally comprises a transmitter 1 and a television receiver 2 which is remote controlled by the remote control signals from the transmitter 1. The transmitter 1 comprises an electroluminescent diode 3 and a modulating circuit 4. The electroluminescent diode 3 may be a GaAs diode emitting infrared radiation, or GaAlAs, GaAsP or GaP diode emitting visible red or green light. When the electroluminescent diode 3 is energized, it emits monochromatic light with a very narrow emission band. For example the monochromatic spectrum distribution of a GaAs diode is shown in FIG. 4A. The half-width is very narrow between the wavelengths 900 and 1,000 mμ.

Figure 5:
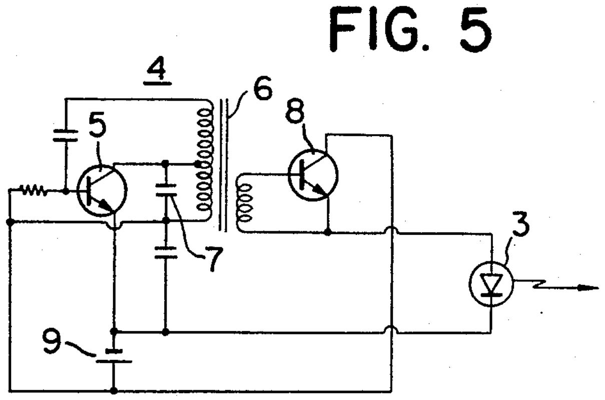
FIG. 5 is a circuit diagram of a transmitter of the remote control system in accordance with the present invention.

The modulating circuit 4 comprises, as shown in FIG. 5, a ultrasonic frequency oscillator comprising an transistor 5, a transformer 6 and a capacitor 7, and a transistor 8 for driving the electroluminescent diode 3, the emitter current of the transistor 8 being amplitudemodulated by the output of the ultrasonic frequency oscillator.

The transistor 8 is forward biased in order to drive the diode 3 with a portion of the output signals derived from the ultrasonic frequency oscillator above a predetermined value, or from the secondary of the transformer connected to the ultrasonic frequency oscillator as illustrated. The light output of the diode is thereby transmitted in pulses. The electroluminescent diode 3 is connected to the emitter circuit of the driving transistor 8. Therefore the remote control light signal emitted from the diode 3 is amplitude-modulated by an ultrasonic frequency which in turn is determined by the inductance of the primary of the transformer 6 and the capacitor 7. In the instant embodiment, the ultrasonic frequency is about 40 KHz because the ambient noise is thereby minimized and in order to facilitate the fabrication of the ultrasonic frequency oscillator. The response of the electroluminescent diode 3 is very fast as compared with an incandescent lamp or the like so that light emitted may be modulated even by such a high frequency as high as about 1 MHz. Therefore the light signal amplitude-modulated by a modulating frequency in the ultrasonic frequency range which has been hitherto impossible to obtain from the conventional light source may be produced. Furthermore light emitted from the diode 3 has a very narrow band width of wavelengths so that relatively little power is required to generate the light signal with a high peak energy. Furthermore the electroluminescent diode 3 may sufficiently emit the light signal using a low DC voltage source 9. Therefore in the instant embodiment, only one dry cell of 1.5 V is used in the transmitter 1. This means that the transmitter may be made very compact in size, light in weight and very portable as is best suited for use in home for remote controlling a television receiver. Furthermore it is the transmitter of the type described that makes it possible to provide a wireless remote control system of the present invention.

Figure 6:
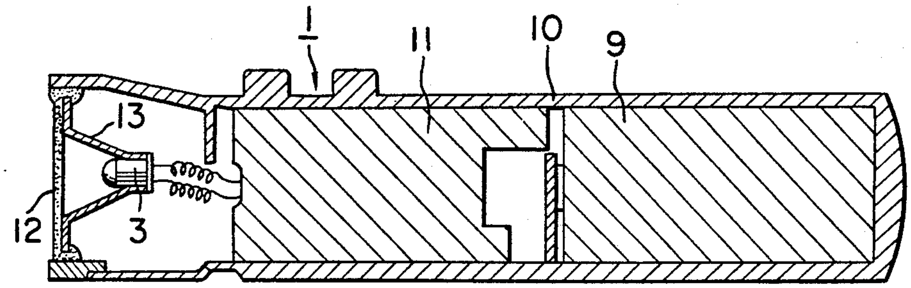
FIG. 6 is a longitudinal sectional view of the transmitter.

FIG. 6 is a longitudinal sectional view of the transmitter 1 incorporating the ultrasonic frequency oscillator, the electroluminescent diode 3 and the dry cell 9. Within a casing 10 of about 14.5 cm in length are disposed the dry cell 9 at the rear, a printed circuit board 11 of the ultrasonic frequency oscillator at the middle, and a transparent acrylic resin plate 12 at the front end. Behind the transparent plate 12 is disposed a conical reflector 13, and the electroluminescent diode 3 is located at the bottom of the cone-shaped reflector 13. It is seen that the transmitter in accordance with the present invention is very compact in size. Light emitted from the diode 3 may be more effectively directed to a desired target when a spheroidal reflector is used.

Referring back to FIG. 3, a control chassis in the television receiver 2 comprises a photoelectric detector 15 for intercepting the light signal transmitted from the transmitter 1, a tuned amplifier 16 centered around the modulating frequency used in the transmitter 1 for passing only the desired signal component of a frequency equal to the modulating ultrasonic frequency so as to remove the noise; a detector 17 for detecting the output of the amplifier 16 so as to give the DC voltage signal; a DC amplifier 18 for amplifying the output of the detector 17; and a circuit 19 to be controlled such as a channel selection motor.

Figure 4B:
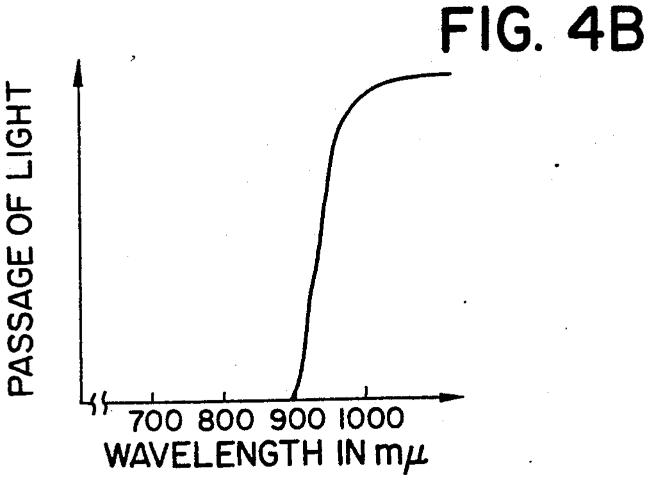

An optical filter 14 placed in front of the detector 15 is an infrared ray filter adapted to pass only the wavelengths higher than the band of the wavelength of light emitted from the diode 3 (See FIG. 4A) as shown in FIG. 4B or an interference filter using metal films adapted to transmit a band of wavelengths of width substantially equal to the band width of the light emitted from the electroluminescent diode 3. The optical filter 14 may improve the S/N ratio at the photoelectric detector 15 because it may prevent the passage of light of unwanted wavelengths even when the illumination around the television receiver 2 is bright. Since the narrow-band tuning amplifier 16 selects only the signal component of modulating frequency (40 KHz) from the light signal transmitted from the diode 3 in the transmitter 1, the noise in the signal may be substantially removed.

Figure 7:
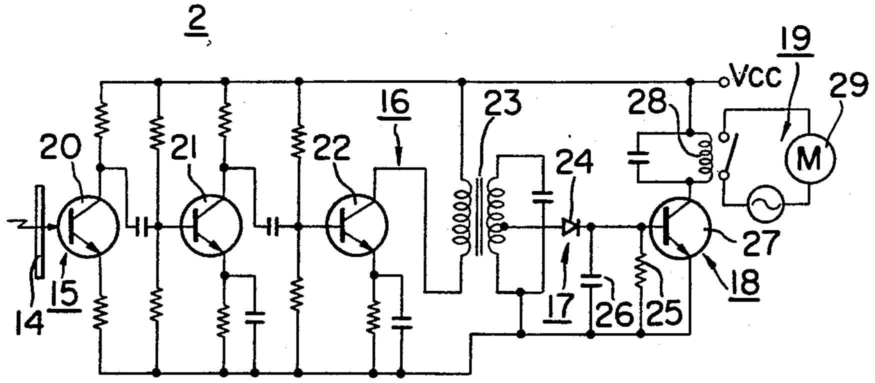
FIG. 7 is a circuit diagram of a remote control chassis of the remote control system incorporated in a television receiver.

FIG. 7 is a circuit diagram of the remote control chassis in the television receiver. A phototransistor 20 is used as a photoelectric detector. The tuning amplifier 16 comprises two transistors 21 and 22 and a tuning transformer 23. The detector 17 comprises a diode 24, a resistor 25 and a capacitor 26. The DC amplifier 18 comprises a transistor 27, and the controlled circuit 19 is shown as comprising a relay 28 and a motor for the channel selection devise 29.

Thus the present invention may provide a remote control system which is compact in size, very reliable in operation and free from the erratic operations caused by noise signals.

What is claimed is:

1. A remote control system for performing a control function by way of a transmission path exposed to ambient light, comprising A. a transmitter assembled within a compact casing, said transmitter including a. an electroluminescent diode for emitting, when energized, a remote control light signal having a relatively narrow spectral width by way of said transmission path;

b. circuit means connected to said diode for energizing said diode at a predetermined ultrasonic frequency said circuit means consisting of an oscillator means comprising an oscillator circuit for oscillating at said predetermined frequency rate, and means for energizing said diode with the output of said oscillator means whereby said remote control light signal is alternately energized and de-energized at said predetermined frequency rate;

c. an electric power source connected to said diode and said circuit means for supplying a low DC voltage thereto to actuate said diode and said circuit means circuit, and d. a light reflector means mounted around said diode for effectively directing said remote control light emitter from said diode to a desired target; and B. a receiver spaced apart from said transmitter for receiving said light signal by way of said transmission path, said receiver including e. a light receiving means for receiving said remote control light signal transmitted from said transmitter, f. a transducing means for detecting said received light signal and for converting a detected light signal into an electric signal by means of a photoelectric detector, g. an amplifier means consisting of a narrow-band tuning amplifier connected to said transducing means for amplifying said converted electric signal, and for selecting only a signal component of frequency in the ultrasonic region from the light signal transmitted from said diode in the transmitter, h. a detector means connected to said amplifier means for detecting said ultrasonic frequency component and for providing a detector output signal, and i. a means connected to the output of said detector means for performing a control function in response to said detector output signal;

whereby spurious ambient light noises received by said receiver from said transmission path are reduced to eliminate any spurious control which may arise from ambient light.

2. The remote control system of claim 1 wherein said means for energizing said diode comprises driving circuit means connected between said oscillator means and said diode for driving said diode with an electric driving current of said predetermined ultrasonic frequency, whereby said remote control light signal emitted from said diode is alternately energized and deenergized at said predetermined ultrasonic frequency.

3. A system as defined by claim 1 wherein said diode has an emission characteristic in the infrared region of the spectrum.

4. A system as defined in claim 1 further comprising an optical filter disposed in front of said photodetector, said filter having a bandpass characteristic that substantially matches the emission characteristic of said diode.

5. A system as defined in claim 4 wherein said diode has an emission characteristic in the infrared region of the spectrum.

6. A remote control system for remotely controlling the channel selector of a television receiver by way of a transmission path exposed to ambient light, comprising:

A. a transmitter assembled within a compact casing for generating a light signal suitable for remotely controlling a television channel selector by way of said transmission path, comprising;

a. an electroluminescent diode for emitting, when energized, a remote control light signal having a relatively narrow spectral width in the infra-red region of the spectrum by way of said transmission path, b. a circuit means connected to said diode for energizing said diode at a predetermined single frequency in an ultrasonic frequency region of the spectrum said circuit means consisting of 1. an oscillator means comprising an oscillator circuit for oscillating at said predetermined single frequency, 2. a driving circuit means connected to said oscillator means and connected to said diode for energizing said diode so as to emit said remote control light signal within a duration less than a half repetition period of the oscillation frequency of said oscillator means, c. an electric power source connected to said diode and said circuit means for supplying a low D.C. voltage thereto to actuate said diode and said, d. a light reflector means mounted around said diode for effectively directing said light signal to a desired target, B. a television receiver spaced from said transmitter for receiving said light signal by way of said transmission path, said receiver including:

e. an optical filter mounted to receive said remote control light from said transmitter by way of said transmission path, said filter having a band pass characteristic that corresponds with the emission characteristic of said diode, f. a photodetector mounted for detecting the received light signal after passing through said optical filter, and for converting a detected light signal into an electric signal, g. an amplifier means including a tuning circuit connected to said photodetector for amplifying said converted electric signal and for selecting said predetermined frequency component in the ultrasonic frequency region and providing it as an output signal, h. a detector means connected to said amplifier means for detecting said predetermined single frequency component, and for providing a D.C. voltage signal corresonding to said output signal, i. a D.C. amplifier connected to amplify said D.C. voltage signal, j. a channel selecting device, and k. means for controlling said channel selecting device with the output signal of said D.C. amplifier.

* * * * *

UNITED STATES PATENT OFFICE

CERTIFICATE OF CORRECTION

Patent No. 3,928,760 Dated December 23, 1975

Inventor(s) Mikio Isoda

It is certified that error appears in the above-identified patent and that said Letters Patent are hereby corrected as shown below:

In column 6, line 16: Before the comma, insert --circuit means--.

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*